United States Patent
Sliwa et al.

(10) Patent No.: US 12,085,013 B2
(45) Date of Patent: Sep. 10, 2024

(54) INTERNAL COMBUSTION ENGINE INCLUDING A CYLINDER CRANKCASE AND A CYLINDER HEAD WITH AN INTEGRATED HEIGHT-ADJUSTABLE FAN ATTACHMENT FOR ELASTIC V-RIBBED BELTS

(71) Applicant: DEUTZ Aktiengesellschaft, Cologne (DE)

(72) Inventors: Marco Sliwa, Siegburg (DE); Johannes Klosterberg, Swisttal (DE)

(73) Assignee: DEUTZ Aktiengesellschaft, Cologne (DE)

( * ) Notice: Subject to any disclaimer, the term of this patent is extended or adjusted under 35 U.S.C. 154(b) by 0 days.

(21) Appl. No.: 17/767,571

(22) PCT Filed: Oct. 5, 2020

(86) PCT No.: PCT/EP2020/000170
§ 371 (c)(1),
(2) Date: Apr. 8, 2022

(87) PCT Pub. No.: WO2021/069089
PCT Pub. Date: Apr. 15, 2021

(65) Prior Publication Data
US 2024/0084729 A1  Mar. 14, 2024

(30) Foreign Application Priority Data
Oct. 9, 2019  (DE) .......................... 102019007007.0

(51) Int. Cl.
*F02B 67/06* (2006.01)
*F02B 75/00* (2006.01)

(52) U.S. Cl.
CPC ............ *F02B 67/06* (2013.01); *F02B 75/007* (2013.01)

(58) Field of Classification Search
CPC .......... F02B 67/06; F02B 67/04; F02B 67/00; F02B 77/00; F02B 77/14; F01P 7/02; F01P 11/00; F01P 2003/021
See application file for complete search history.

(56) References Cited

U.S. PATENT DOCUMENTS

| | | | | |
|---|---|---|---|---|
| 1,002,848 A | * | 9/1911 | Huff ........................ | F02B 67/04 123/195 A |
| 1,530,299 A | * | 3/1925 | Robert .................... | F16N 13/10 184/27.1 |

(Continued)

FOREIGN PATENT DOCUMENTS

| | | | |
|---|---|---|---|
| CN | 2744842 Y | * | 12/2005 |
| CN | 203769913 U | * | 8/2014 |

(Continued)

OTHER PUBLICATIONS

International Search Report for PCT/EP2020/000170, dated Dec. 21, 2020.

*Primary Examiner* — George C Jin
*Assistant Examiner* — Teuta B Holbrook
(74) *Attorney, Agent, or Firm* — Davidson Kappel LLC

(57) ABSTRACT

An internal combustion engine including a cylinder crankcase and a cylinder head with an integrated height-adjustable fan attachment for elastic V-ribbed belts. 2. An internal combustion engine including a crankcase (1), at least one device for driving a fan, in particular of a vehicle, in particular a commercial vehicle, is described. The internal combustion engine includes a fan bracket (3) and a bearing device (5) via which the fan is displaceably situated relative to the crankshaft of an internal combustion engine of the drive unit; and a belt drive via which the fan is drivable, including a first belt pulley and a second belt pulley which (Continued)

are in drive connection via a belt (8), the first belt pulley being situated on the bearing device (5).

8 Claims, 4 Drawing Sheets

(56) References Cited

U.S. PATENT DOCUMENTS

| | | | |
|---|---|---|---|
| 1,639,449 | A | | 8/1927 Baker et al. |
| 2,526,242 | A | | 10/1950 La Salle et al. |
| 3,362,243 | A | * | 1/1968 Ferguson .................. F01P 5/02 |
| | | | 123/195 A |
| 3,603,296 | A | | 9/1971 Mitchell et al. |
| 6,079,385 | A | | 6/2000 Wicke et al. |

FOREIGN PATENT DOCUMENTS

| | | | |
|---|---|---|---|
| CN | 207776980 U | * | 8/2018 |
| DE | 2113533 A1 | | 10/1971 |
| DE | 23 18104 A1 | | 10/1974 |
| DE | 4216135 A1 | * | 11/1992 |
| DE | 103 24314 A1 | | 3/2004 |
| DE | 10317507 A1 | | 11/2004 |
| EP | 0 884210 A2 | | 12/1998 |
| JP | H0842341 A | * | 2/1996 |
| JP | 2001220771 | | 8/2001 |
| JP | 2008031937 A | | 2/2008 |

\* cited by examiner

INTERNAL COMBUSTION ENGINE INCLUDING A CYLINDER CRANKCASE AND A CYLINDER HEAD WITH AN INTEGRATED HEIGHT-ADJUSTABLE FAN ATTACHMENT FOR ELASTIC V-RIBBED BELTS

The present invention relates to an internal combustion engine including a cylinder crankcase and a cylinder head with an integrated height-adjustable fan attachment for elastic V-ribbed belts.

BACKGROUND

Internal combustion engines of this type are known, for example, from JP-A2008-31937 or the Japanese Unexamined Patent publication JPA2001-220771.

An invention is provided in Japanese Unexamined Patent publication JP-A2008-31937, in which a compressor is situated relative to an engine on one side in a horizontal direction perpendicular to a shaft midpoint of an output shaft of the engine, while a generator is situated on the other side.

An invention is provided in the Japanese Unexamined Patent publication JP-A2001-220771, in which on a top side of an engine, a generator and a compressor are situated next to one another in a shaft midpoint direction of an output shaft of the engine. In addition, an invention is provided in which on a top side of an engine, a generator and a compressor are situated next to one another in a horizontal direction perpendicular to a shaft midpoint of the engine.

A device for driving units of an internal combustion engine, such as a coolant pump and a fan, via a first belt drive that is drivable from a crankshaft by a first belt pulley that is connected to the crankshaft is provided in the Unexamined Patent Application publication EP 0 884 210 A2. The first belt pulley is in drive connection, via a belt, with a second belt pulley that is connected to a coolant pump shaft. A third belt pulley is connected to the coolant pump shaft. The third belt pulley together with a fourth belt pulley, which is supported on the crankshaft or an extension of the crankshaft so that it is rotatable with respect to the crankshaft, form a second belt drive. The fan is in drive connection with the fourth belt pulley. A stepped-up transmission for the fan drive may thus be achieved, although this requires provision of an additional belt pulley at the coolant pump shaft, which due to the additional stresses is accompanied by an increased risk of leaks, and for reasons of installation space, also often requires a high level of implementation effort. A further disadvantage is the resulting additional bearing stress on the auxiliary units and possibly the requirement to redesign them.

DE 23 18 104 provides a fan drive in which the fan is driven via a V-belt drive, driven as a function of the engine speed, and a slip clutch, the driving portion of the slip clutch being rotatably fixedly connected to the V-belt pulley, and the V-belt pulley and the driving portion of the slip clutch being relatively rotatable via a bearing, and provided coaxially with respect to a shaft on which the driven portion of the slip clutch and the fan are articulatedly connected in a rotationally locked manner. A disadvantage once again is the resulting additional bearing stress on the auxiliary units via the shared shaft, even when it is decoupled in terms of rotational speed. Furthermore, a slip clutch is necessary.

DE 103 24 314 A1 provides a fan drive that is drivable by an internal combustion engine of a motor vehicle with the aid of a fluid friction clutch, and including means for increasing the fan speed. The fan is situated coaxially with respect to the crankshaft of the internal combustion engine. Auxiliary units that are drivable by the internal combustion engine via a shared first belt drive with a stepped-up transmission are providable axially parallel to the crankshaft. The fan is directly drivable by the crankshaft via a first drive train, into which the liquid friction clutch, made up of a drive shaft, drive pulley, and housing, as well as a freewheel unit are connected, and alternatively, to increase the fan speed, is drivable via a second drive train that includes a second belt drive from an auxiliary unit onto the liquid friction clutch, and is engageable or disengageable via a shifting clutch. The disadvantage of this approach is the complex design and the resulting comparatively high component costs for implementing the fan drive, since a slip clutch and a free-wheeling element, for example, are necessary.

The compactness of internal combustion engines is taken into account in their development. In particular, the length of the engine is crucial in order to maintain compactness of the devices into which this engine is to be installed. The cylinder crankcase and the cylinder head including their fan attachment represent one criterion for the engine length. Known designs include height-adjustable fan brackets that are screwed in in front of or at the cylinder crankcase and/or in front of or at the cylinder head. The brackets sometimes accommodate clamping elements for the V-ribbed belt. Alternatively, clamping elements for the V-ribbed belt are fastened to the cylinder crankcase and/or the cylinder head. The fan attachments are fastened to the fan brackets. The fan attachments accommodate the fan, including the belt pulley and the fan bearing. This requires a sufficiently large installation space.

BACKGROUND

It is an object of the present disclosure to refine the approaches known from the prior art while avoiding the disadvantages described above. An object of the present disclosure in particular is to provide a fan drive that is implementable cost-effectively, with sparing of components, and with small installation space requirements and that improves manufacture and installation.

The present disclosure provides an internal combustion engine that includes a crankcase (1), at least one device for driving a fan, in particular of a vehicle, in particular a commercial vehicle, including a fan bracket (3), and a bearing device (5) via which the fan is displaceably situated relative to the crankshaft of an internal combustion engine of the drive unit; and a belt drive via which the fan is drivable, including a first belt pulley and a second belt pulley which are in drive connection via a belt (8), the first belt pulley being situated on the bearing device (5).

DETAILED DESCRIPTION

Figure 1:
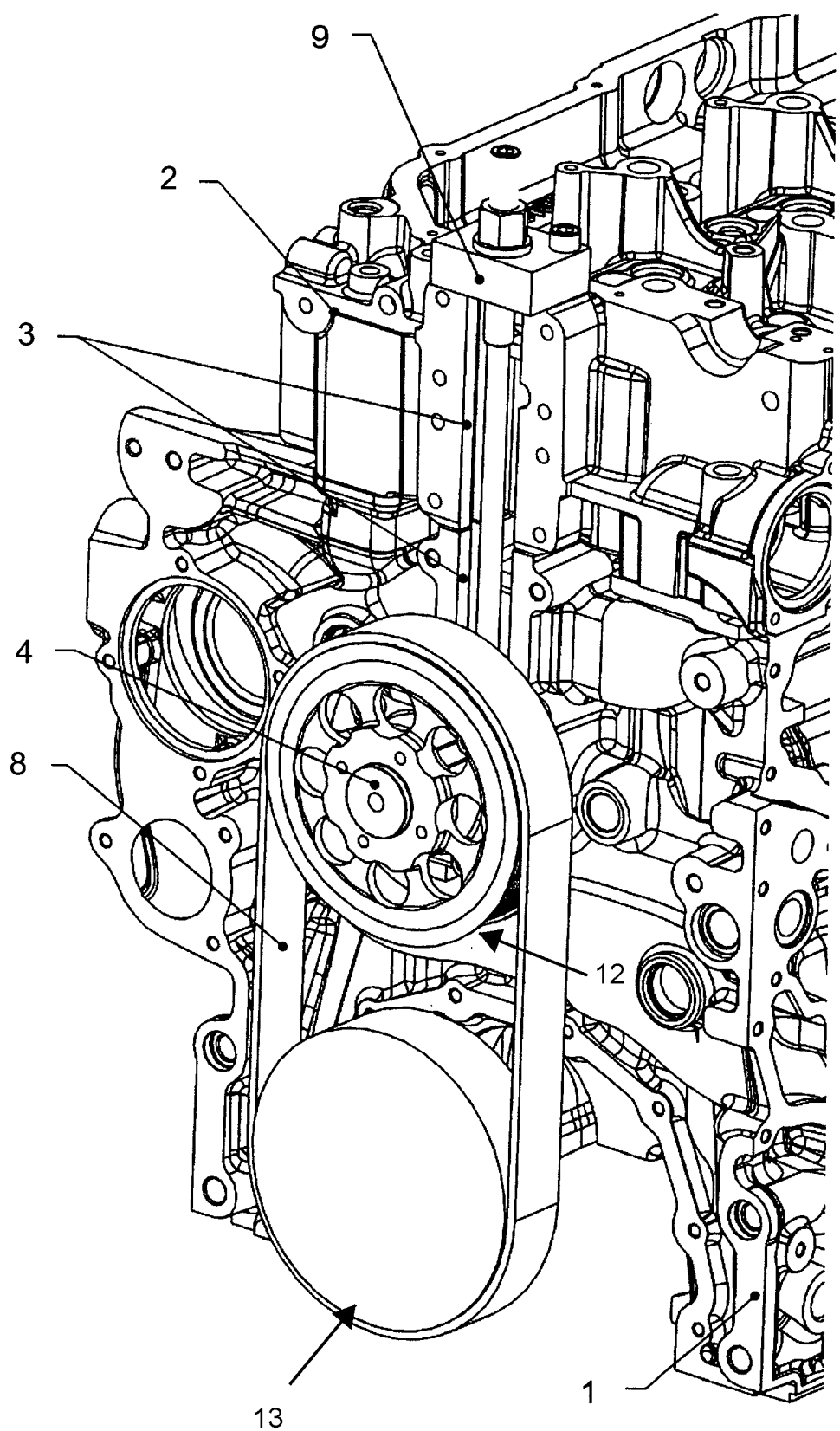
FIG. 1 shows an internal combustion engine including fan attachments such as a fan, belt pulley, and fan bearing.
Figure 2:
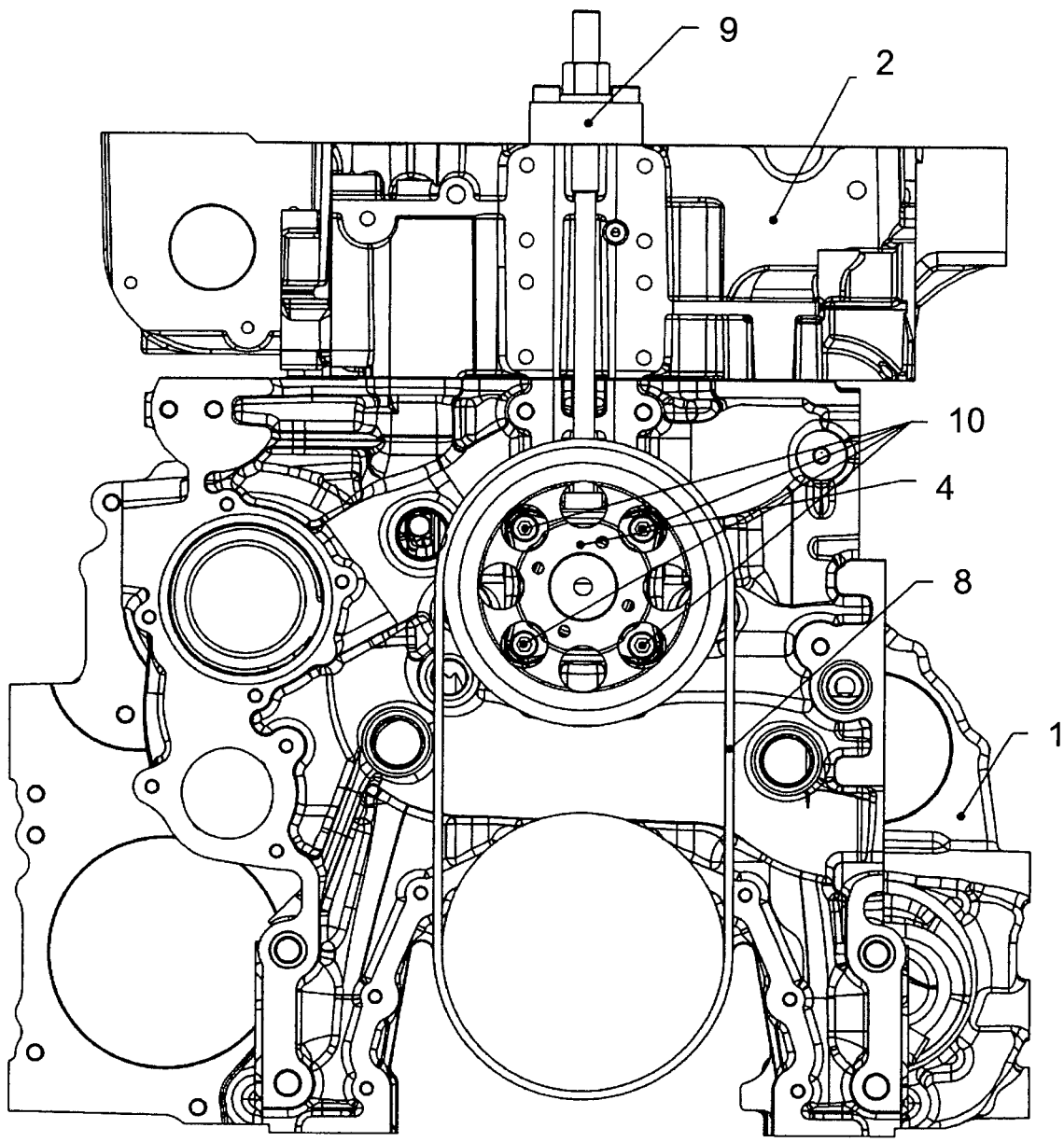
FIG. 2 shows the front side of the internal combustion engine from FIG. 1 with a view of the fan.

FIGS. 1 and 2 illustrate an internal combustion engine including fan attachments such as a fan, belt pulleys 12, 13, and a fan bearing 5, which observably reduces the installation length of the engine. This is achieved by integrating height-adjustable fan bracket 3 into cylinder crankcase 1 and cylinder head 2. The fan attachments including the fan, belt pulleys 12, 13, and fan bearing 4 are then fastened directly to cylinder crankcase 1 and/or cylinder head 2. Fan bearing 5 extends in two interior guide grooves 6 in the manner of a T-slotted nut or a T-shaped sliding block (also referred to as a slot nut); one threaded hole, or in the present case four threaded holes, is/are situated in fan bearing 5 for accommodating screws 10. Such a slot nut is used, for example, to connect a machine bench and a workpiece in a machine tool. The slot nut is axially displaceably situated in a T-groove of the bench, or in the present case in guide groove 6, which is situated in cylinder crankcase 1 and/or in cylinder head 2. The slot nut provides a screw-on point for the workpiece with the aid of a corresponding specialized screw, and its height within a predefined screw hole 7 may be adjusted. The pretensioning of an elastic V-ribbed belt 8 is achieved by bringing the fan attachments, including the fan, belt pulleys, and fan bearing 4, into the desired position using an installation/clamping tool 9, and subsequently screwing them to cylinder crankcase 1 and/or to cylinder head 2 with the aid of screws 10. Installation/clamping tool 9, which is made up of a thrust bearing that may be screwed to cylinder head 2 above guide groove 6 and includes a guide hole for accommodating a toothed rack that is screwed into a thread in slot nut 11, is removably situated. A nut via which toothed rack may adjust the height of fan bearing 5 is situated at the thrust bearing, on the toothed rack. Installation/clamping tool 9 may be removed after fan bearing 5 has been fixed in its working position with the aid of screws 10.

Alternatively, it is provided that the four through holes for accommodating screws 10 include threads at slot nut 11, so that slot nut 11 may be braced against guide grooves 6 with the aid of screws 10, so that fan bearing 5 may be situated so that it is adjustable in height.

Figure 3:
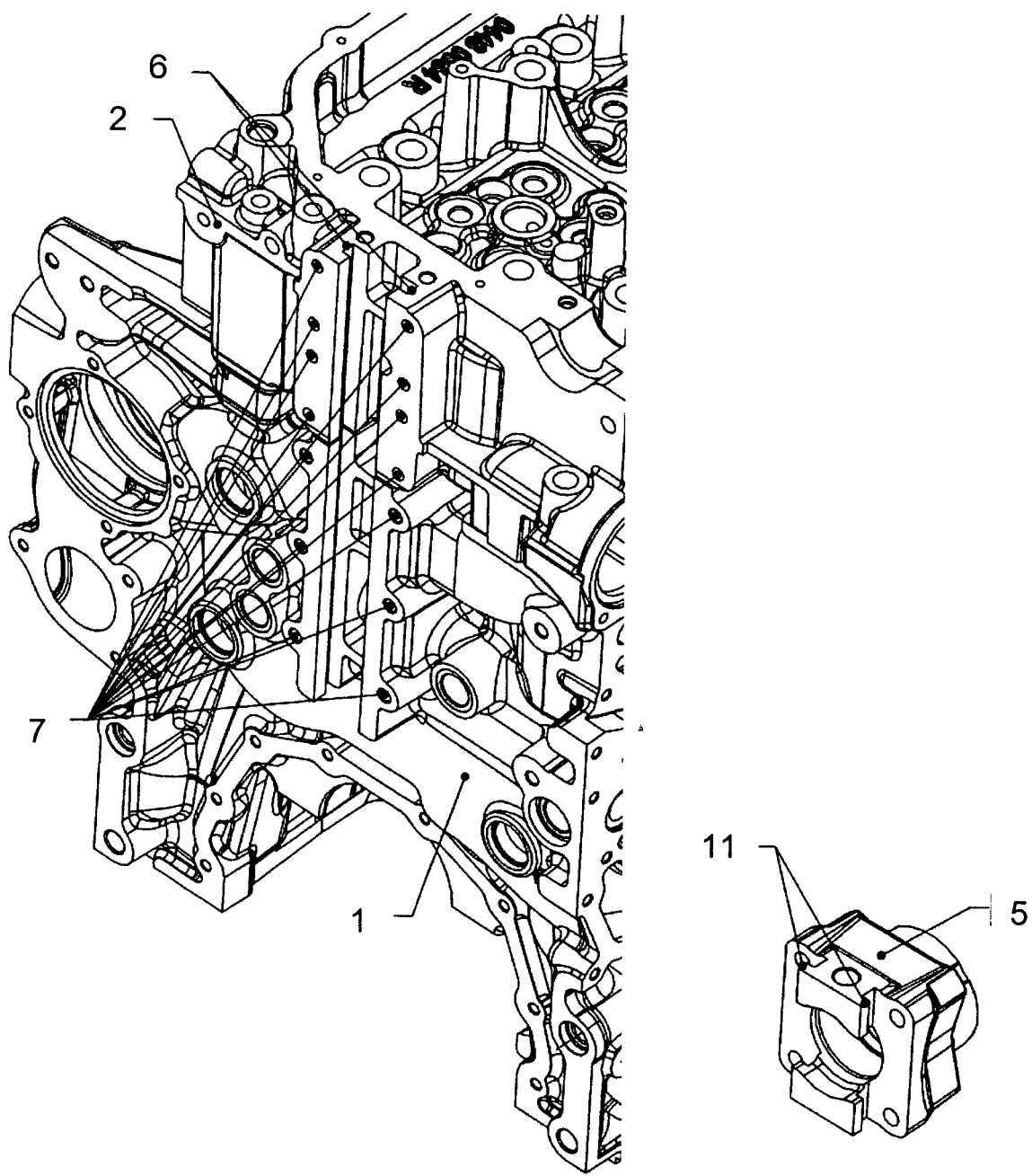
FIG. 3 shows the internal combustion engine without fan attachments and with the fan bearing uninstalled.

FIG. 3 illustrates the internal combustion engine from FIGS. 1 and 2, with fan bearing 5 uninstalled. The rear side of fan bearing 5 is designed as a slot nut 11. With the aid of this slot nut 11, the fan bearing is guided into guide grooves 6 of cylinder head 2 and cylinder crankcase 1 and fixed in the work position via screws 10 in the threads of screw hole 7.

Figure 4:
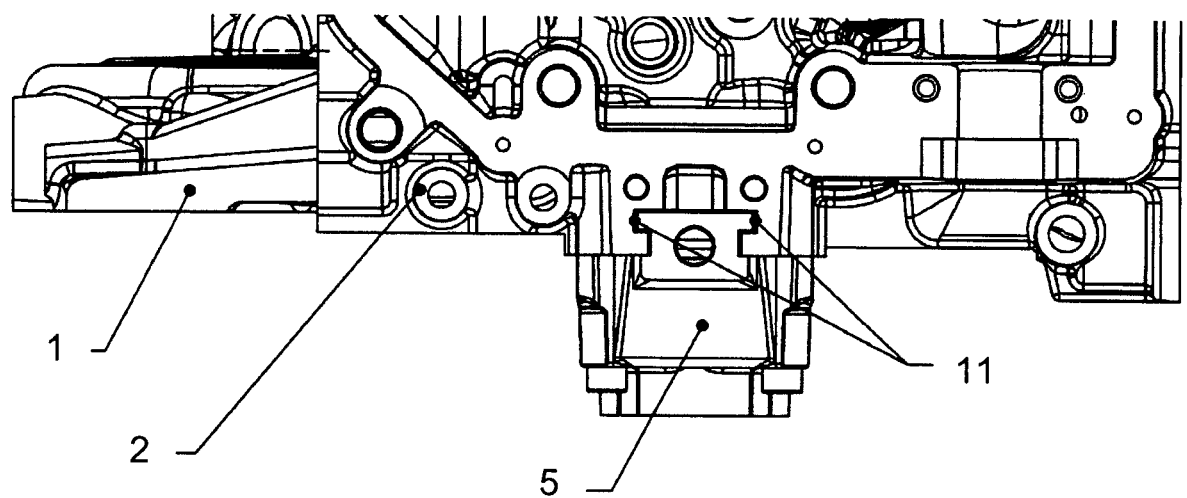
FIG. 4 shows a top view onto the front side of the internal combustion engine, including the fan bearing.

FIG. 4 shows a top view onto the front side of the internal combustion engine, including fan bearing 5. The arrangement of slot nut 11 of fan bearing 5 in guide grooves 6, which are incorporated into cylinder head 2 and cylinder crankcase 1, is apparent here.

LIST OF REFERENCE NUMERALS 1 cylinder crankcase
2 cylinder head
3 fan bracket
4 fan bearing
5 fan bearing
6 guide grooves
7 predefined screw hole
8 V-ribbed belt
9 installation/clamping tool
10 screws
11 T-slot nut
belt pulleys 12, 13

What is claimed is:

1. An internal combustion engine comprising:
   a crankcase;
   a cylinder head;
   a fan bracket integrated into the crankcase and/or cylinder head, wherein the fan bracket comprises a guide groove which is formed in the crankcase and/or cylinder head;
   a fan bearing via which a fan is displaceably situated relative to a crankshaft of the internal combustion engine, wherein the fan bearing is a T-shaped sliding block arranged axially displaceable in the guide groove; and
   a belt drive via which the fan is drivable, including a first belt pulley and a second belt pulley which are in drive connection via a belt, the first belt pulley being situated on the fan bearing.

2. The internal combustion engine as recited in claim 1, wherein the belt is a V-ribbed belt.

3. The internal combustion engine as recited in claim 1, wherein the fan bracket includes multiple screw holes.

4. The internal combustion engine as recited in claim 3, wherein the guide groove is two interior guide grooves of the fan bracket, and the fan bearing is situated within the predefined multiple screw holes so as to be adjustable in height.

5. The internal combustion engine as recited in claim 1, wherein the fan bracket includes an installation/clamping tool for displacing the fan bearing relative to the crankcase.

6. The internal combustion engine as recited in claim 1, wherein the installation/clamping tool is removable.

7. A method for operating the internal combustion engine as recited in claim 1, comprising:
   operating the internal combustion engine.

8. An internal combustion engine comprising:
   a crankcase;
   a cylinder head;
   a fan bracket connected to the crankcase and/or cylinder head;
   a belt drive via which a fan is drivable, including a first belt pulley and a second belt pulley which are in drive connection via a belt; and
   a fan bearing supporting the first belt pulley, the fan bearing being slidable along the fan bracket to adjust a height of the fan relative to a crankshaft of the internal combustion engine, wherein the fan bearing is a T-shaped sliding block arranged axially displaceable in a guide groove of the fan bracket.

* * * * *